W. V. GILBERT.
STARTING DEVICE FOR INTERNAL COMBUSTION ENGINES.
APPLICATION FILED NOV. 22, 1912.
1,105,509.
Patented July 28, 1914.
3 SHEETS—SHEET 1.
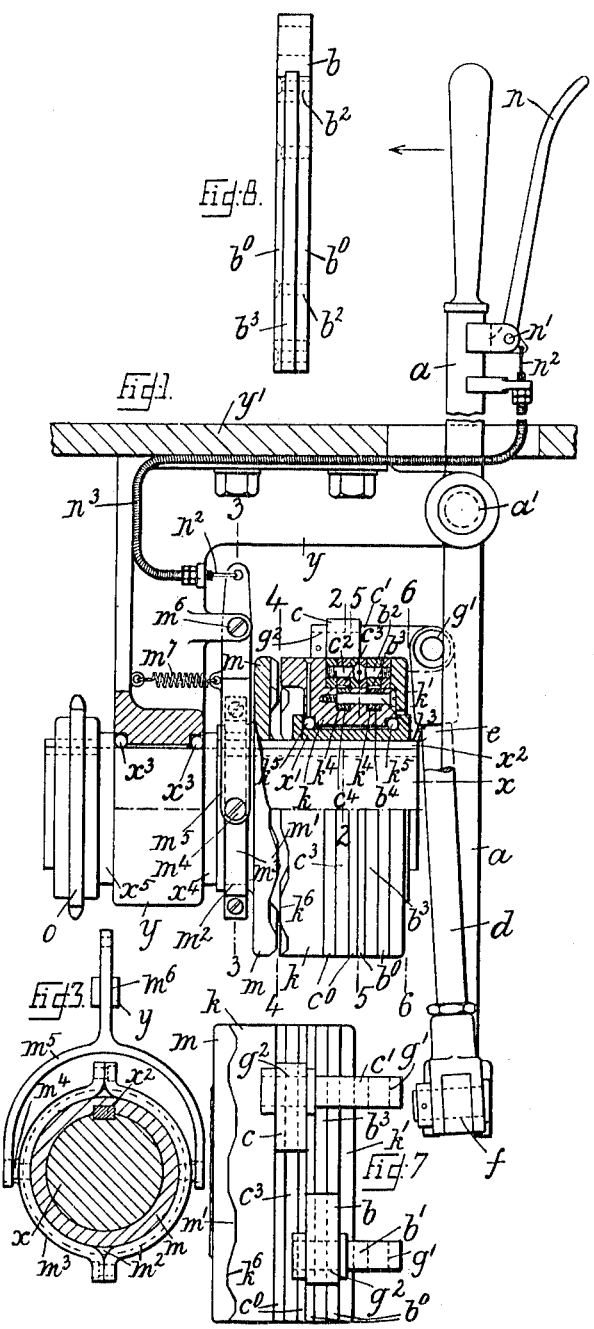
WITNESSES
INVENTOR
WALTER VILLA GILBERT
ATTORNEYS

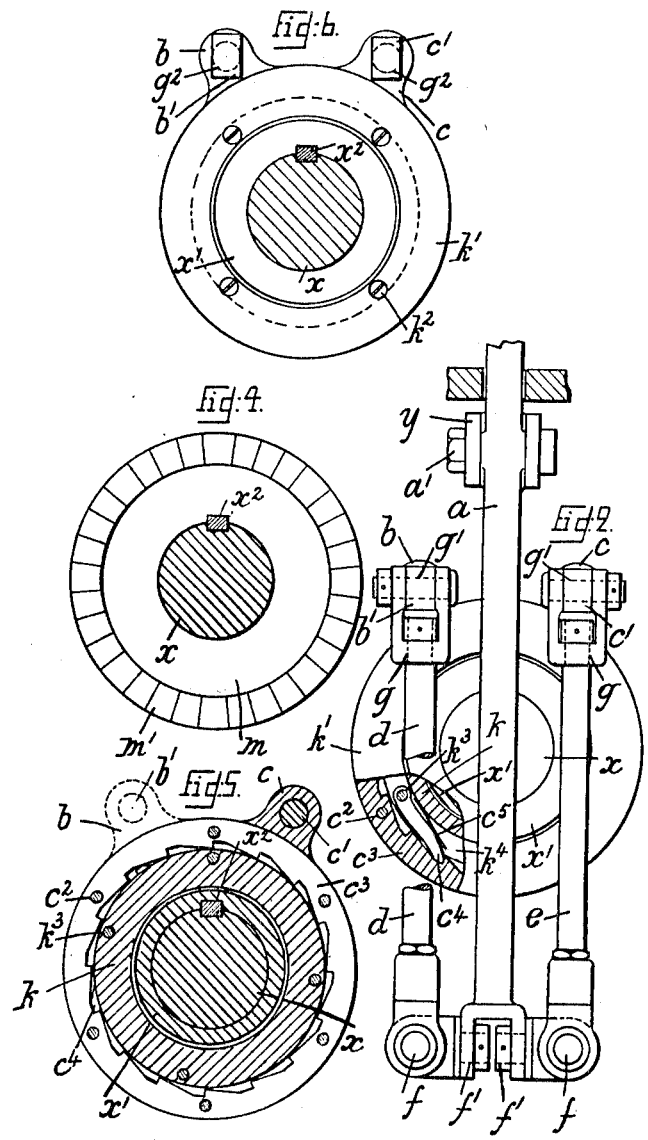

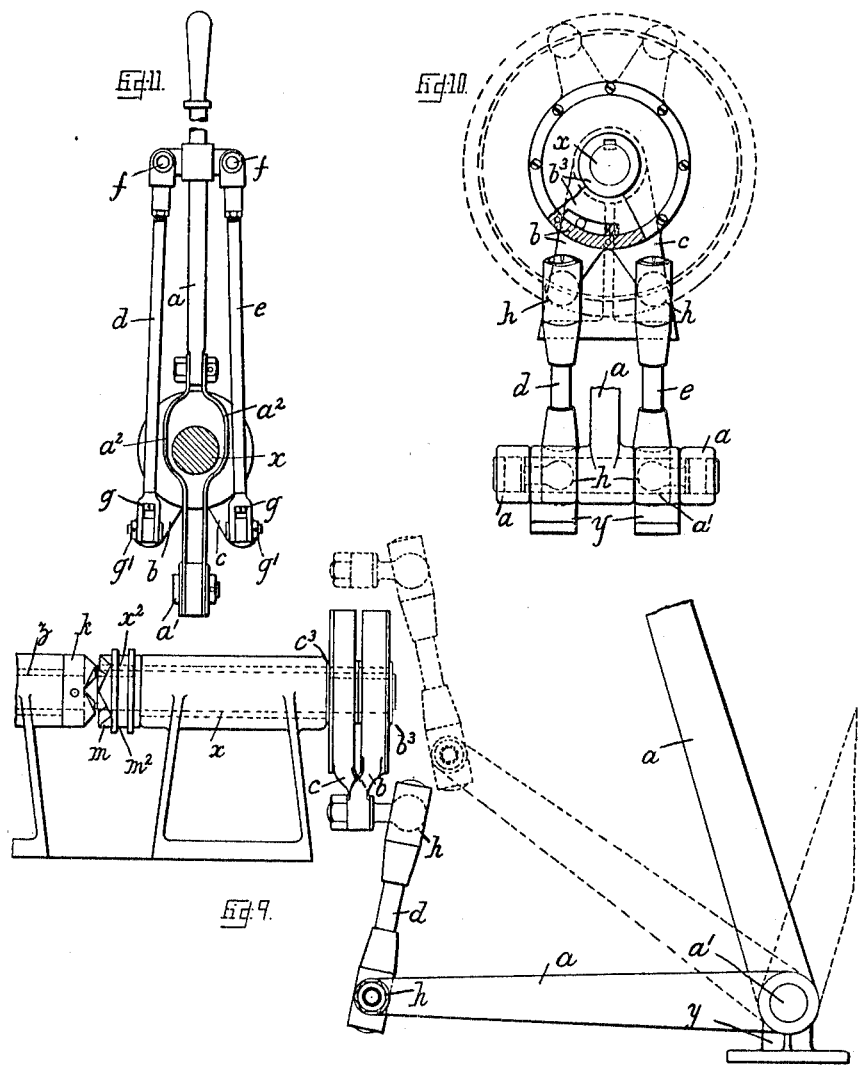

UNITED STATES PATENT OFFICE.

WALTER VILLA GILBERT, OF EAST HAM, ENGLAND.

STARTING DEVICE FOR INTERNAL-COMBUSTION ENGINES.

1,105,509.  Specification of Letters Patent.  Patented July 28, 1914.

Application filed November 22, 1912. Serial No. 732,876.

*To all whom it may concern:*

Be it known that I, WALTER VILLA GILBERT, a subject of the King of Great Britain and Ireland, and a resident of East Ham, Essex, England, have invented an Improved Starting Device for Internal - Combustion Engines and Similar Purposes; and I do hereby declare the following to be a full, clear, and exact description of the same.

My invention is a starting device for internal combustion engines used on motor cars, aeroplanes and the like, in which it is necessary to cause an initial turning or revolution of the engine shaft or the like otherwise than by its own motive power.

The invention has for its object to provide mechanism which will convert oscillating movement into rotary or turning movement in one direction and may be located conveniently near the driver's or pilot's seat and may be actuated therefrom, and which enables a considerable leverage to be obtained greater than is available with the usual forward crank handle, and lessens or prevents shock to the operator due to backfiring, and dispenses with the use of powerful clutch actuating springs as customarily used.

To this end, the improved apparatus comprises a hand or foot primary lever mounted on a suitable pivot on the motor car frame or other structure and adapted to be oscillated by the driver, pilot, or other operator, a pair of crank members mounted on a suitable axis on said structure, a pair of opposing links respectively connected at one end to the lever at some distance from its fulcrum and at the other end to the respective cranks, a rotary driven member which may be the engine shaft, and a pair of free wheel devices or equivalents adapted to drive in the same direction for connecting the respective cranks one at a time to the rotary driven member. The rotary driven member is preferably constructed as one member of a clutch and adapted to be engaged by a second member of the clutch, the clutch members having inclined faces and one member being slidable.

The arrangement and operation of the apparatus is such that when the primary lever is swung over in one direction, one link, say the first, causes its crank to turn through an arc counter-clockwise, and the second link causes the second crank to turn through an arc clockwise; so that one crank, say the first, drives the rotary driven member counter-clockwise, and the second crank slips on the rotary driven member and is moved to position ready for exerting a positive drive thereon; and when the hand lever is swung back, the first link causes its crank to turn clockwise, and the second link causes the second crank to turn counter-clockwise; so that the first crank now slips on the rotary driven member and is returned to position ready for exerting a positive drive thereon, and the second crank now drives the rotary driven member farther counter-clockwise. As the rotary driven member attains momentum it will override both free wheel devices. Should a backfire occur while the primary lever is being actuated, the inclined faces of the rotary driven member will disengage and but little if any shock will reach the operator.

The invention is illustrated in the accompanying drawings, in which:—

Figure 1 is a side sectional elevation, partly in section, of one modification; Fig. 2 is a part end elevation, looking from the right of Fig. 1, partly in section on 2—2, Fig. 1; Figs. 3, 4, 5 and 6, are transverse sections on 3—3, 4—4, 5—5, and 6—6, Fig. 1; Fig. 7 is a plan of a detail; Fig. 8 is a side elevation of a detail; Fig. 9 is a part side elevation of another modification; Fig. 10 is an end elevation, looking from the right of Fig. 9, partly in section; Fig. 11 is an end elevation of another modification.

Like reference letters indicate like or equivalent parts wherever repeated in the drawings.

In carrying out the invention according to the constructions represented, a primary hand lever, $a$, is mounted near the driver's seat on a stationary pivot, $a^1$, on a bracket, $y$, on the motor car frame or other support, $y^1$, with facility of being oscillated in a vertical plane. Two crank members, $b$, $c$, are mounted on a horizontal shaft or axis, $x$, so as to oscillate in a plane or planes at right angles to that in which the lever moves, the cranks pins, $b^1$, $c^1$, being situated on opposite sides of the axis, $x$. Two opposing links, $d$, $e$, are respectively connected at one end to the hand lever, and at the other end to the respective cranks, by suitable joints, such as bi-axial joints, $f$—$f^1$, and tri-axial joints, $g$—$g^1$—$g^2$, or by ball-and-socket joints, $h$.

The lever and link and crank mechanism is preferably of the type described in the specifications of British Letters Patent No. 28479 of 1910, and No. 9656 of 1911, granted to me.

In lieu of being constructed of a straight formation, the hand lever may be made as a bell-crank having an approximately horizontal limb arranged as represented in Fig. 9, so that the links operate (*vide* the dotted lines) in a plane approximately parallel to that in which either crank oscillates, to obtain a better turning moment.

Referring particularly to Fig. 1, each crank member, $b$, $c$, is constructed with two sides, $b^0$, $c^0$, between which is secured by screws, $b^2$, $c^2$, a ratchet ring, $b^3$, $c^3$. The crank members and ratchet rings are loosely mounted on a rotary clutch member, $k$, being held in place by an end plate, $k^1$, and screws, $k^2$. Pawls, $b^4$, $c^4$, are mounted on studs, $k^3$, in channels, $k^4$, surrounding the clutch member, $k$, being normally held in engagement with the ratchet rings, by springs, as at $c^5$. The clutch member, $k$, is mounted on anti-friction bearings, $k^5$, on a sleeve, $x^1$, held fast by a key, $x^2$, on the shaft, $x$, which may be supported on the bracket, $y$, by anti-friction bearings, $x^3$, engaging removable collars, $x^4$, $x^5$. Thus when the hand lever, $a$, is swung as aforesaid the clutch member, $k$, is rotated by the consecutive actions of the two sets of pawl and ratchet gearings.

$m$ is a second clutch member mounted on the shaft, $x$, being prevented from being rotated thereon by the key, $x^2$, but having facility of being slid therealong. The clutch members, $k$, $m$, have inclined faces or teeth, $k^6$, $m^1$, adapted to be engaged with one another by a spring, but preferably by means which will next be described.

The slidable clutch, $m$, is formed with a surrounding channel, $m^2$, in which loosely lies a non-rotary ring or collar, $m^3$, provided with trunnions or pivots, $m^4$, connecting it to a fork, $m^5$, pivoted at $m^6$, on the bracket, $y$. The fork may be held in position so as to separate the clutch member, $m$, from the clutch member, $k$, by a spring, $m^7$, and may be operated so as to engage the clutch members, by a secondary lever, $n$, pivoted at $n^1$, on the handle of the primary lever, $a$, and connected to the fork by a cable, $n^2$, passing through a flexible tube, $n^3$, or by other suitable connections, so that when the hand is applied to the primary lever, $a$, the fingers will embrace the secondary lever also, and the clutch member, $m$, will be forced fast against the clutch member, $k$, and will be positively driven by the latter, when the primary lever is pulled in the direction represented by the arrow, or pushed in the reverse direction. Should a backfire occur, the shock will only be felt by the operator's fingers which will automatically release their grip owing to instinctive relaxation of the muscles.

One member of each free wheel device operated by the crank members, say the ratchet member, $b^3$, $c^3$, may be mounted fast on the shaft, $x$, as represented in Figs. 9 and 10. Here, the free wheel devices are constructed on the well known principle or roller and inclined plane. Here also, the slidable clutch member, $m$, is shown keyed on the shaft, $x$, and driven by the cranks, and the clutch member, $k$, is shown mounted fast on a separate shaft, $z$, in axial alinement with the shaft, $x$.

The shaft, $x$, or $z$, may be a countershaft or the engine shaft. In the former case, a sprocket wheel or the like, $o$, may be mounted on the shaft, adapted to drive a wheel, preferably a free wheel, on the engine shaft through a chain or other suitable transmission. In the latter case, the primary lever, $a$, may be forked or equivalently shaped as represented at $a^2$, Fig. 11, to accommodate the shaft, $x$, extending fore and aft of the lever.

What I claim as my invention and desire to secure by Letters Patent is:—

1. Apparatus for starting internal combustion engines and the like comprising, in combination, a rotary driven member constructed as a clutch member, a pivotally mounted primary lever, a pair of crank members rotatably mounted on the rotary clutch member, a pair of links on opposite sides of the axis of the rotary clutch member and respectively connected at one end to the lever and at the other end to the respective cranks, multi-axial joints at said connections, a second rotary clutch member adapted to engage the first, inclined faces on said clutch members for separating said clutch members should a backfire occur, a fork and tension means for holding the clutch members out of engagement, a secondary lever pivoted on the primary lever, means for transmitting movement from the secondary lever to the fork to cause it to hold the clutch members in engagement, and a pair of free wheel devices adapted to drive in the same direction for connecting the respective cranks one at a time to the rotary driven member.

2. Apparatus for starting internal combustion engines and the like comprising, in combination, a rotary driven member constructed as a clutch member, a hand primary lever adapted to oscillate in a plane parallel to the axis of the rotary clutch member, a pair of crank members mounted on the rotary clutch member, a pair of links on opposite sides of said axis and respectively directly connected at one end to the lever and at the other end to the respective cranks, joints at said connections permitting relative turning movements in more than one direction between the links and the lever and between the links and the cranks and having axes of turning in alinement with the links, a pair of free wheel mechanisms adapted to drive in the same direction interposed between the cranks and the rotary clutch member, a second rotary clutch member adapted to be held in engagement with the first clutch member, inclined faces on said clutch members for separating said clutch members should a backfire occur, a fork and tension means acting thereon for normally holding the clutch members out of engagement, a secondary lever pivoted on the primary lever, and flexible means for transmitting movement from the secondary lever to the fork for holding the clutch members in engagement.

In testimony whereof I affix my signature, in presence of two subscribing witnesses.

WALTER VILLA GILBERT.

Witnesses:
 ALFRED DAY,
 WALKER DAY.

Copies of this patent may be obtained for five cents each, by addressing the "Commissioner of Patents, Washington, D. C."